United States Patent [19]

Bravo

[11] Patent Number: 4,853,518
[45] Date of Patent: Aug. 1, 1989

[54] TANK-TYPE HEATING APPARATUS FOR FLUID OR DOUGHY FOOD PRODUCTS

[75] Inventor: Francesco Bravo, Montecchio Maggiore, Italy

[73] Assignee: Bravo S.p.A., Vincenza, Italy

[21] Appl. No.: 188,964

[22] Filed: May 2, 1988

[30] Foreign Application Priority Data

May 8, 1987 [IT] Italy .............................. 21553/387[U]

[51] Int. Cl.⁴ .............................................. H05B 3/36
[52] U.S. Cl. .................................... 219/441; 219/439; 219/430
[58] Field of Search ............... 219/441, 439, 438, 436, 219/430, 521

[56] References Cited

U.S. PATENT DOCUMENTS

| | | | |
|---|---|---|---|
| 1,028,107 | 6/1912 | Hadaway | 219/436 |
| 2,443,806 | 6/1948 | Shafter | 219/436 |
| 3,231,716 | 1/1966 | Vanden Bosch | 219/441 |
| 4,063,068 | 12/1977 | Johnson | 219/439 |
| 4,307,287 | 12/1981 | Weiss | 219/441 |

FOREIGN PATENT DOCUMENTS 0111445 6/1984 European Pat. Off. ............ 219/438

Primary Examiner—Teresa J. Walberg
Attorney, Agent, or Firm—Shlesinger, Fitzsimmons & Shlesinger

[57] ABSTRACT

A tank-type heating apparatus of the kind employing heating elements realized in flexible material, applied to the outer walls of the tank of the said apparatus, wherein the outer surface of the said heating elements that is opposite the surface in contact with at least part of the outer surface of the said tank is in contact with a mantle of heat-conductive material which extends over the whole of said outer surface of the said heating elements and which also extends beyond the said surface so as to enter into contact also with at least part of the outer surface of the said tank not covered by the said heating elements.

2 Claims, 1 Drawing Sheet

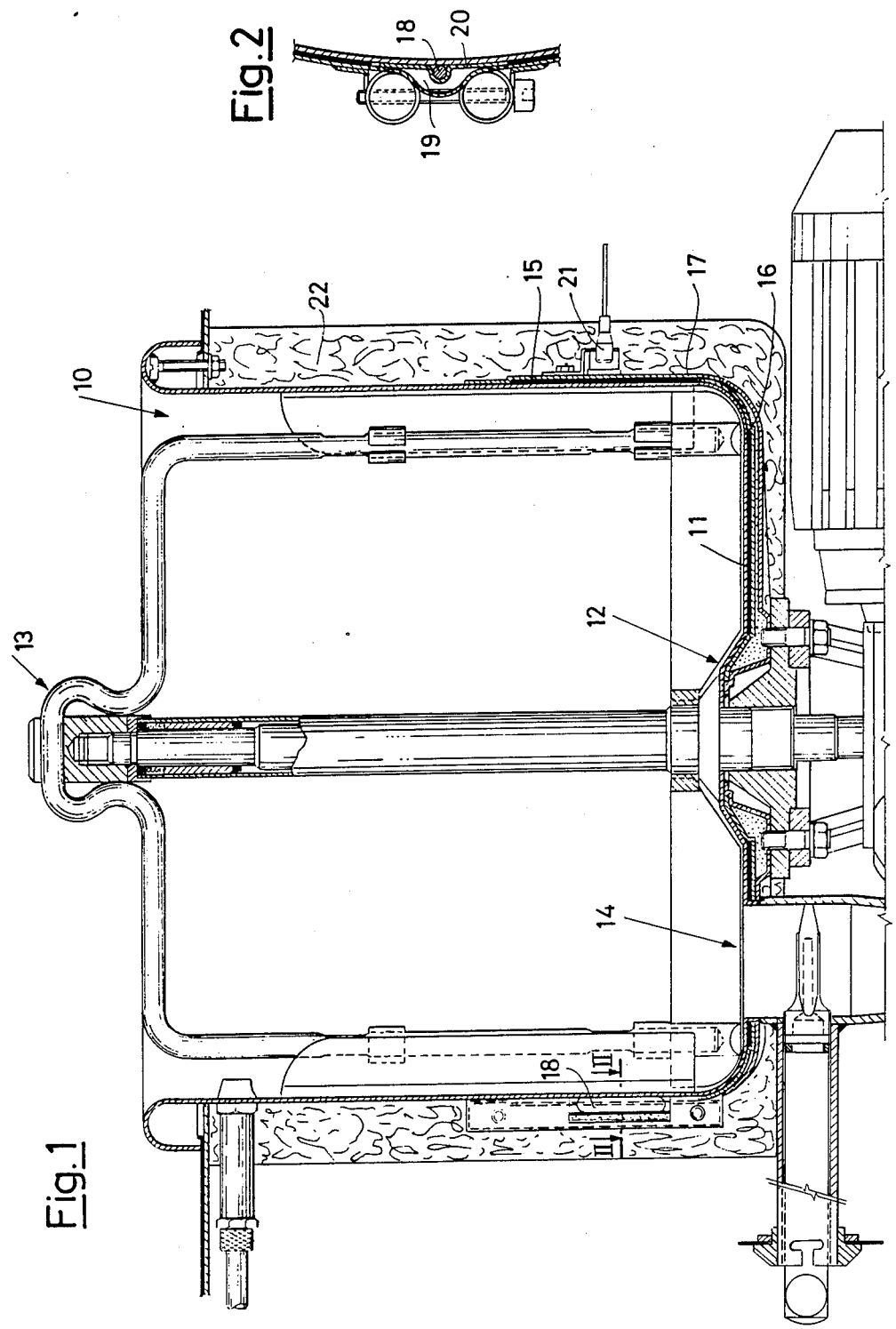

TANK-TYPE HEATING APPARATUS FOR FLUID OR DOUGHY FOOD PRODUCTS

Heating tanks using electrical resistances are known for the process of fluid or doughy food products, as for example in pasteurizers for preparing icecreams and creams. Such resistances are generally applied on the outer surface of the tank and can be of various kinds. The most frequently found are the coil type consisting of a resistance coil which may be in some cases inserted between two metal plates to promote uniform distribution of the heat, and the oil-bath type in which the resistance element is immersed in oil which is in turn in contact with the outer walls of the tank to which walls it uniformly transmits the heat generated by the electrical resistance.

However, the said types of heater have several defects: for example the oil-bath type, although ensuring highly uniform heat distribution, presents the problem of having to be embodied with a hollow space external to the cistern for containing the oil, with the result that, as well as making the realisation more costly, it is in the long term affected by the problem of possible oil leaks; for this reasons the use of this type of system for heating tanks has been almost wholly relinquished.

The coil type of heater, on the other hand, has the disadvantage of not ensuring a perfectly uniform heating of the tank in that it produces on it certain areas, proximal to the points of contact of the tank with the coil, in which the temperature is higher; these higher-temperature areas can cause burning of the products placed in the tank for heating purposes. Moreover, both the said heating system have the disadvantage (much more acute in the oil-bath type) of the high degree of heat inertia of the system due to the large mass of the heating elements -which causes difficulties in achieving a precise temperature regulation of the content of the tank.

In order to overcome in part the problems mentioned, heating elements have for a considerable time been realized that consist of electrical resistances let into a flexible material to form a very fine foil readily adaptable to the surface to be heated. These heating elements also have an adhesive side to make it easier to apply them to the surface. In this way the aim is achieved of having good heat uniformity and, as a result of the minimal thickness of the resulting heating elements, a low heat inertia -which permits very precise temperature control and regulation.

The said flexible heating elements unfortunately have the disadvantage (for the specific application in question) of giving out their generated heat on both sides and it follows from this that while the heat emitted on the side in contact with the tank to be heated is fully exploited, that emitted on the other side is lost, and heats only any heat-insulating material disposed around the tank. This lends to much waste of electrical energy.

The overall object of the present invention is to obviate the aforesaid difficulties and disadvantages by embodying a heating tank using flexible heating elements, which consequently has the aforesaid advantages of such elements compared to other system and also eliminates the dispersion on the side of such elements that are not in direct contact with the tank or bowl.

To achieved the said object, according to the innovative principles of the invention a tank-type heating apparatus is embodied of the kind using heating elements realized in flexible material which are applied to the outer walls of the tank of the said apparatus, wherein the outer surface of the said heating elements opposite the surface in contact with at least a part of the outer surface of the said tank is in contact with a mantle of heat-conductive material which extends over the whole of said outer surface of the said heating elements and which also extends beyond the said surface so as to come into contact with at least part of the outer surface of the said tank not covered by the said heating elements.

The functional and structural characteristics of the invention, and its advantages over the known art, will become more apparent from an examination of the following description, referred to the appended drawings, which illustrate an example of an embodiment in accordance with the innovative principles of the invention. In the drawings:

FIG. 1 is a vertical sectional view of a heating and mixing tank employing the principles on the invention;

FIG. 2 is a partial section taken on the line A—A of FIG. 1.

With reference to the drawings, the tank 10 has on its outer surface heating elements consisting of flexible electrical heating resistances adhering to it. The said heating elements consist, in accordance with known art, of electrical resistances completely sunk in a cohesive matrix so as to form low-thickness flexible foils. These foils can optionally have one surface coated with adhesive to make it easier to secure them to the surface to be heated. In the embodiment here described, realized applying the principles of the invention, the heating elements so composed are two in number, disposed on the outer surface of the tank 10. The first heating element 11 is disposed on the bottom of the tank 10 and is shaped so that will adapt to it; in the particular instance represented the said heating element 11 has a generally discoid form is bored both at the centre, to permit the entry into interior of the tank 10 of the structure 12 forming the base of the mixer 13, and intermediately betweeen centre and periphery to allow a discharge 14 to be connected to the tank 10. The second heating element 15, on the other hand, is disposed along the outer lateral periphery of the tank 10 in a position towards the bottom of the tank and thus in the area closest to the first heating element 11. The second element 15 has the form of a strip of a width less than half the height of the tank 10 and of a length slightly less that the length of the perimeter along which it is disposed.

According to the innovative principles of the invention, both the first heating element 11 and the second element 15 have the side opposite that which adheres to the tank covered with a mantle of heat-conductive material (for example copper sheet) adhering to the said opposite side.

There will thus be a first mantle 16 which covers the first heating element 11 and a second mantle 17 which covers the second element 15. Although as regards shape both mantles follow that of the heating elements covered by them, they have larger dimensions than these so as to extend beyond the edges of the said elements 11 and 15; in addition, the said mantles 16 and 17 are shaped so that they adhere perfectly to the surface of the heating elements (11 and 15 respectively) with which type are in contact and, through the agency of the parts exceeding the dimensions of the said heating elements, also adhere perfectly to the part of the tank 10 corresponding to them.

As is shown in FIG. 1 and in greater detail and from a different angle in FIG. 2, in the area of the tank, at the height of the second heating element - which remains free (i.e. not covered by element 15) owing to the fact that the length of said second element is less than the length of the perimeter of the tank 10, there is inserted a sensor 18, which is a sensor of the temperature of the mixture contained in the tank and is thermally insulated from the outside by an insulant layer 19, and which is covered with a fascia of heat-conductive material 20 (e.g. copper) which extends for a certain section in the said area remaining free from the heating element 15 and in direct contact with the outer surface of the tank which is at that point heated solely by its content; the thus disposed sensor 18 provides an exact and dependable measurement of the temperature reached by such content. In addition, in contact with the mantle 17 covering the second heating element 15 is a second temperature sensor 21 which measures the temperature of such mantle which is, as the result of conduction, the same as that reached by the second heating element 15. Through the information obtained by the probes 18 and 21 it is in this way possible to have an optimal temperature control both in respect of the content of the tank and in respect of the electrical resistance.

To prevent heat dispersions and thus to promote performance and, in the final analysis, economy-in-service, the tank is also covered with a layer of heat insulant 22 disposed so that it wraps fully around the outer part of the tank and the mantles of heat-conductive material.

As a result of the disposition of the mantles on the heating elements and then in contact with the tank, the heat produced by the said heating elements on the surface opposite that in direct contact with the tank is also conducted onto the tank to exploit, for the heating of the content of the tank, the heat produced by both surfaces of the heating elements, minimizing the dispersions that normally occur on the free outer side of flexible heating elements and, consequently, in the heating tanks of the known art which employ such elements.

The present invention brings the great advantage of obtaining a reduced electric energy consumption for the same heat produced to heat the content of the tank as compared with tanks not applying the principles of the invention. In addition, uniform heating is obtained also at the point where the bottom and lateral wall of the tank meet, this being a point which, owing to the very narrow radius of curvature, cannot be covered by the heating elements; these, even if flexible, have limits to the maximum flexure they can bear before their internal resistance are broken. In this manner there is achieved a homogeneous heating on the entire low-lying area of the tank, a heating which then decreases gradually, rising along the lateral wall so as to avoid burning the content of the tank when this contains small quantities of product.

Moreover, the possibility of fixing a temperature sensor to the mantle -in direct contact with the heating element-enables a precise indication of the temperature of such element to be obtained, thus ensuring a flawless temperature control and so, if by means of the said sensor the attainment of the maximum temperature is controlled, it is possible to prevent any overheatings that would cause burning of the content of the tank and damage the heating elements.

I claim:
1. Tank-type heating apparatus comprising
   a tank,
   at least one heating element made of flexible material secured to at least a first portion of an outer surface of the tank, an outer surface of the said heating element, opposite a surface of the heating element in contact with the outer surface of the said tank, being in contact with a mantle of heat-conductive material which extends over the whole of said outer surface of the said heating element, and which also extends beyond said outer surface of said element so as to enter into contact, also with at least a further portion of the outer surface of said tank not covered by the said heating element,
   a first temperature sensor for controlling the temperature of said heating element and being secured in contact with the surface of the said mantle which is opposite to the surface thereof that is in contact with the said heating element, and
   a second temperature sensor secured in direct contact with a still further portion of outer surface of the tank which is not covered by said element or mantle, and which is operative for controlling the temperature of the content of the said tank.
2. Tank-type heating apparatus as described in claim 1,, wherein there are at least two heating elements each of which is covered by a mantle of heat-conductive material, and which are disposed externally both on the bottom of the said tank and on its lateral walls, respectively.

* * * * *